(12) United States Patent
Xiang et al.

(10) Patent No.: US 11,341,300 B1
(45) Date of Patent: May 24, 2022

(54) BOILER DESIGN METHOD AND SYSTEM FOR SUPERCRITICAL CARBON DIOXIDE UNIT, AND STORAGE MEDIUM

(71) Applicant: HUAZHONG UNIVERSITY OF SCIENCE AND TECHNOLOGY, Wuhan (CN)

(72) Inventors: Jun Xiang, Wuhan (CN); Meng Zhu, Wuhan (CN); Jing Zhou, Wuhan (CN); Lei Chen, Wuhan (CN); Haoran Qing, Wuhan (CN); Sheng Su, Wuhan (CN); Song Hu, Wuhan (CN); Aishu Li, Wuhan (CN); Jun Xu, Wuhan (CN); Yi Wang, Wuhan (CN); Long Jiang, Wuhan (CN)

(73) Assignee: HUAZHONG UNIVERSITY OF SCIENCE AND TECHNOLOGY, Wuhan (CN)

( * ) Notice: Subject to any disclaimer, the term of this patent is extended or adjusted under 35 U.S.C. 154(b) by 0 days.

(21) Appl. No.: 17/561,983

(22) Filed: Dec. 26, 2021

Related U.S. Application Data

(63) Continuation of application No. PCT/CN2021/078217, filed on Feb. 26, 2021.

(30) Foreign Application Priority Data

Feb. 9, 2021 (CN) .......................... 202110188000.9

(51) Int. Cl.
G06F 30/20 (2020.01)
G06F 119/08 (2020.01)
G06F 111/10 (2020.01)

(52) U.S. Cl.
CPC .......... *G06F 30/20* (2020.01); *G06F 2111/10* (2020.01); *G06F 2119/08* (2020.01)

(58) Field of Classification Search
CPC ... G06F 30/20; G06F 2119/08; G06F 2111/10
See application file for complete search history.

(56) References Cited

U.S. PATENT DOCUMENTS 10,072,531 B2 9/2018 Hwang

FOREIGN PATENT DOCUMENTS

| CN | 104421922 A | 3/2015 |
| CN | 104764545 A | 7/2015 |

(Continued)

OTHER PUBLICATIONS

Chao L, Ke L, Yongzhen W, Zhitong M, Yulie G. The effect analysis of thermal efficiency and optimal design for boiler system. Energy Procedia. May 1, 2017;105:3045-50. (Year: 2017).*

(Continued)

*Primary Examiner* — Chuen-Meei Gan
(74) *Attorney, Agent, or Firm* — Bayramoglu Law Offices LLC

(57) ABSTRACT

A boiler design method and system for a supercritical carbon dioxide unit, and a storage medium are provided. The boiler design method includes the following steps: step 1, determining a boiler type, known design parameters and unknown design parameters of boilers to be designed; step 2, acquiring operating parameters of each selected supercritical carbon dioxide unit respectively, and establishing a relational expression among a plurality of operating parameters in the operating parameters of each supercritical carbon dioxide unit respectively; and step 3, substituting the known design parameters in step 1 into the relational expression determined in step 2, and calculating the unknown design parameters. The operating parameters of the boilers, with the optimal performance, of the supercritical carbon dioxide unit are selected to establish the relational expression, and the determined operating parameters are substituted into the relational expression to calculate design parameters to be determined.

16 Claims, 3 Drawing Sheets

(56) References Cited

FOREIGN PATENT DOCUMENTS

| CN | 106870037 A | 6/2017 |
|---|---|---|
| CN | 110320803 A | 10/2019 |

OTHER PUBLICATIONS

Yazdanfar J, Mehrpooya M, Yousefi H, Palizdar A. Energy and exergy analysis and optimal design of the hybrid molten carbonate fuel cell power plant and carbon dioxide capturing process. Energy conversion and management. Jul. 1, 2015;98:15-27. (Year: 2015).*

De Paepe M, T'Joen C, Huisseune H, Van Belleghem M, Kessen V. Comparison of different testing methods for gas fired domestic boiler efficiency determination. Applied thermal engineering. Jan. 10, 2013;50(1):275-81. (Year: 2013).*

Suchartsunthorn N, Siemanond K. Two-stage stochastic optimization of carbon dioxide supply chain and utilization model through carbon dioxide capturing process. InComputer Aided Chemical Engineering Jan. 1, 2017 (vol. 40, pp. 727-732). Elsevier. (Year: 2017).*

Cost Indexes of Quota Design Parameters in Thermal Power Project, 2018, pp. 1-234, Electric Power Planning and Engineering Institute.

Zhu Meng, et al., Boiler design and economic analysis for 660 MW supercritical carbon dioxide coal-fired unit, Thermal Power Generation, 2020, pp. 136-143, vol. 49, No. 10.

Zhu Meng, et al., Study on 1000 MW Coal-Fired Unit Boiler Design for Supercritical Carbon Dioxide, Journal of Combustion Science and Technology, 2020, pp. 567-574, vol. 26, No. 6.

\* cited by examiner

Determining a boiler type, known design parameters and unknown design parameters of boilers to be designed, wherein the known design parameters and the unknown design parameters constitute a design parameter set of the boilers to be designed, and the design parameter set includes a design number of boilers in the supercritical carbon dioxide unit, a thermal design power of a single boiler to be designed, a design temperature of a main working medium, a design pressure of the main working medium, a design cost of a single primary reheating boiler and a design cost of a single secondary reheating boiler Selecting a plurality of supercritical carbon dioxide units, a boiler type of each selected supercritical carbon dioxide unit being the same as that of the boiler to be designed, and each of the plurality of supercritical carbon dioxide units includes one or more boilers; acquiring operating parameters of each selected supercritical carbon dioxide unit respectively, the operating parameters of each supercritical carbon dioxide unit including the number n of boilers in each supercritical carbon dioxide unit, a power generation efficiency η of each supercritical carbon dioxide unit, a power generation capacity W of each supercritical carbon dioxide unit, an actual thermal power Q of a single boiler, a temperature t of the main working medium, a pressure P of the main working medium, a cost Cs of a single primary reheating boiler and a cost Cd of a single secondary reheating boiler; and establishing a relational expression among a plurality of operating parameters in the operating parameters of each supercritical carbon dioxide unit respectively Substituting the known design parameters in step 1 into the relational expression established in step 2, and calculating the unknown design parameters

FIG. 1

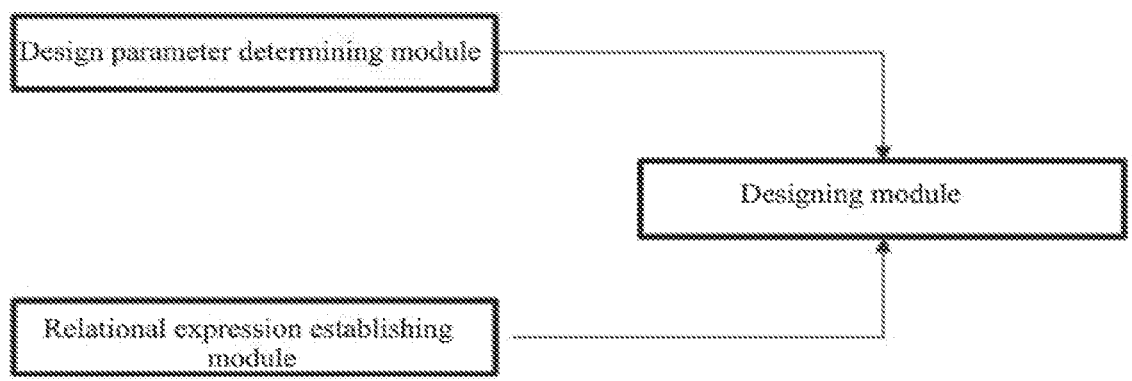

FIG. 2

BOILER DESIGN METHOD AND SYSTEM FOR SUPERCRITICAL CARBON DIOXIDE UNIT, AND STORAGE MEDIUM

CROSS REFERENCE TO THE RELATED APPLICATIONS

This application is the continuation application of International Application No. PCT/CN2021/078217, filed on Feb. 26, 2021, which is based upon and claims priority to Chinese Patent Application No. 202110188000.9, filed on Feb. 9, 2021, the entire contents of which are incorporated herein by reference.

TECHNICAL FIELD

The present invention relates to the field of supercritical boiler technologies, in particular to a boiler design method and system for a supercritical carbon dioxide unit, and a computer storage medium.

BACKGROUND

A supercritical carbon dioxide boiler is one of key equipment for a supercritical carbon dioxide coal-fired power generation technology. Because a working medium of the supercritical carbon dioxide boiler is different from that of a traditional water boiler, and changes in a working medium in a boiler will cause substantial changes in the boiler structure, a design method for traditional water boilers is not suitable for supercritical carbon dioxide boilers. At present, there is still a lack of design methods for boiler configurations and operating parameters of the supercritical carbon dioxide boilers.

In the case of designing a supercritical carbon dioxide boiler, it is necessary to comprehensively consider a power generation capacity in a supercritical carbon dioxide unit, as well as a boiler type and operating parameters of the supercritical carbon dioxide boiler. At present, the supercritical carbon dioxide boiler designed with experiences of designers does not necessarily have optimal operating parameters of the boiler, while operating parameters will affect the cost and operating efficiency of the supercritical carbon dioxide boiler, which hinders the further development of supercritical carbon dioxide coal-fired power generation technologies.

SUMMARY

In order to solve the above technical problems, the present invention provides a boiler design method for a supercritical carbon dioxide unit. The specific technical solutions are summarized as follows.

A boiler design method for a supercritical carbon dioxide unit specifically includes the following steps.

step 1, determining a boiler type, known design parameters and unknown design parameters of boilers to be designed, wherein the known design parameters and the unknown design parameters constitute a design parameter set of the boilers to be designed, and the design parameter set includes a design number of boilers in the supercritical carbon dioxide unit, a thermal design power of a single boiler, a design temperature of a main working medium, a design pressure of the main working medium, a design cost of a single primary reheating boiler and a design cost of a single secondary reheating boiler;

step 2, selecting a plurality of supercritical carbon dioxide units, a boiler type of each selected supercritical carbon dioxide unit being the same as that of the boilers to be designed, and each of the plurality of selected supercritical carbon dioxide units includes one or more boilers; acquiring operating parameters of each selected supercritical carbon dioxide unit respectively, the operating parameters of each supercritical carbon dioxide unit include a number n of boilers in each supercritical carbon dioxide unit, a power generation efficiency η of each supercritical carbon dioxide unit, a power generation capacity W of each supercritical carbon dioxide unit, an actual thermal power Q of a single boiler, a temperature t of the main working medium, a pressure P of the main working medium, a cost $C_s$ of a single primary reheating boiler and a cost $C_d$ of a single secondary reheating boiler; and establishing a relational expression among a plurality of operating parameters in the operating parameters of each supercritical carbon dioxide unit respectively; and step 3, substituting the known design parameters in the step 1 into the relational expression established in step 2 respectively, and calculating the unknown design parameters.

The present invention provides a boiler design method for a supercritical carbon dioxide unit, wherein operating parameters of boilers, with optimal performance, in the supercritical carbon dioxide unit are selected to establish a relational expression, and the unknown design parameters are calculated based on the known design parameters in the boilers to be designed and the relational expression, thereby acquiring the boiler design with the optimal performance.

Optionally, establishing the relational expression among the plurality of operating parameters in the operating parameters of each supercritical carbon dioxide unit respectively in step 2 specifically includes: establishing a relational expression among the number n of the boilers in each supercritical carbon dioxide unit and the power generation efficiency 9 of each supercritical carbon dioxide unit, the power generation capacity W of each supercritical carbon dioxide unit and the actual thermal power Q of a single boiler, wherein the relational expression among the number n of the boilers in each supercritical carbon dioxide unit and the power generation efficiency η of each supercritical carbon dioxide unit, the power generation capacity W of each supercritical carbon dioxide unit and the actual thermal power Q of a single boiler is as follows:

$$n=(\eta^{-1} \times W)/Q,$$

in which, n is the number of the boilers in each supercritical carbon dioxide unit; η is the power generation efficiency of each supercritical carbon dioxide unit; W is the power generation capacity of each supercritical carbon dioxide unit; and Q is the actual thermal power of a single boiler.

Preferably, the unknown design parameter is a design number of boilers if the known design parameters include the thermal design power $Q_{re}$ of a single boiler; and after a design power generation capacity of the supercritical carbon dioxide unit to which the boilers to be designed belong and a design power generation efficiency of the supercritical carbon dioxide unit are determined, a selection coefficient for the design number of the boilers to be designed is as follows:

$$\zeta=(\eta_{re}^{-1} \times W_{re})/Q_{re};$$

in the case of ζ<1.4, the design number n of the boilers to be designed is 1;

in the case of X.4≤ζ<X.6, the design number n of the boilers to be designed is X or X+1; and in the case of X.6<ζ<(X+1).4, the design number n of the boilers to be designed is X+1, in which, X is an integer greater than or equal to 1; $\eta_{re}$ is the design power generation efficiency of each supercritical carbon dioxide unit; $W_{re}$ is the design power generation capacity of each supercritical carbon dioxide unit; and $Q_{re}$ is the thermal design power of a single boiler.

When the determined design parameters include the thermal design power $Q_{re}$ of a single boiler, a value calculated from the design power generation efficiency of the unit and the design power generation capacity of the unit as well as the thermal design power $Q_{re}$ of the single boiler should be an integer, namely, the design number of the boilers to be designed. The actual thermal power of the single boiler is determined after the design number of the boilers to be designed is selected.

Preferably, establishing the relational expression among the plurality of operating parameters in the operating parameters of each supercritical carbon dioxide unit respectively in step 2 specifically includes: establishing a relational expression among the cost $C_s$ of a single primary reheating boiler and the power generation efficiency η of each supercritical carbon dioxide unit, the power generation capacity W of each supercritical carbon dioxide unit, the actual thermal power Q of a single boiler, the number n of boilers in each supercritical carbon dioxide unit, the temperature t of the main working medium and the pressure p of the main working medium, wherein the relational expression among the cost $C_s$ of a single primary reheating boiler and the power generation efficiency η of each supercritical carbon dioxide unit, the power generation capacity W of each supercritical carbon dioxide unit, the actual thermal power Q of a single boiler, the number n of boilers in each supercritical carbon dioxide unit, the temperature t of the main working medium and the pressure p of the main working medium is as follows:

$$C_s = (r_1 \times (Q + r_2 t + r_3)^2 + r_4)(r_5 P + r_6)(r_7 t + r_8) + r_9, \text{ or}$$

$$C_s = (r_1 \times (\eta^{-1} \times W/n + r_2 t + r_3)^2 + r_4)(r_5 P + r_6)(r_7 t + r_8) + r_9, \text{ in}$$

which, $C_s$ is the cost of a single primary reheating boiler; Q is the actual thermal power of a single boiler; P is the pressure of the main working medium; t is the temperature of the main working medium; η is the power generation efficiency of each supercritical carbon dioxide unit; W is the power generation capacity of each supercritical carbon dioxide unit; and $r_1, r_2, r_3, r_4, r_5, r_6, r_7, r_8$, and $r_9$ are all coefficients.

The above relational expression establishes a relationship among the cost $C_s$ of a single primary reheating boiler and the actual thermal power Q of a single boiler, the temperature t of the main working medium, and the pressure P of the main working medium. If the determined design parameters include any three of the cost $C_s$ of the single primary reheating boiler, the design thermal power of the single boiler, the design temperature of the main working medium, and the design pressure of the main working medium, the value of the remaining parameter may be determined in the case of the optimal performance.

Preferably, in the case of the minimum cost of a single primary reheating boiler, a relational expression between the actual thermal power Q of a single boiler and the temperature t of the main working medium is as follows:

$$Q = -r_2 t - r_3,$$

in which, Q is the actual thermal power of a single boiler; t is the temperature of the main working medium; and $r_2$ and $r_3$ are coefficients.

Preferably, if the known design parameters include the thermal design power $Q_{re}$ of a single boiler and the unknown design parameters include the design temperature of the main working medium, the design temperature $t_{re}$ of the main working medium is $[0.95(-r_3-Q_{re})/r_2, 1.05(-r_3-Q_{re})/r_2]$ in the case of the minimum cost $C_s$ of a single primary reheating boiler and the optimal performance.

If the determined design parameter is the design temperature of the main working medium, the thermal design power of a single boiler can be calculated through the above relational expression in the case of the minimum cost of the primary reheating boiler. Then, the actual thermal power of a single boiler is determined after the design number of boilers is selected based on the design power generation capacity of each supercritical carbon dioxide unit and the design power generation efficiency of each supercritical carbon dioxide unit.

If the determined design parameter is the thermal design power of a single boiler, the design temperature of the main working medium can be calculated through the above relational expression in the case of the minimum cost of the primary reheating boiler.

Preferably, if the known design parameters include the thermal design power $Q_{re}$ of a single boiler and a maximum design cost $C_{re,s}$ of a primary reheating boiler of a single boiler, and the unknown design parameters include the design temperature of the main working medium and the design pressure of the main working medium, a value range of the design pressure $P_{re}$ of the main working medium is as follows:

$$\left[100, \frac{C_{re,s} - r_9}{(r_1(Q_{re} + r_2 t + r_3)^2 + r_4)(r_7 t_{re} + r_8) r_5} - \frac{r_6}{r_5}\right].$$

Because the design method described in the present invention is suitable for the supercritical carbon dioxide unit, the pressure of the main working medium needs to be limited to 100 bar or more. If the determined design parameter is the thermal design power $Q_{re}$ of a single boiler, the thermal design power of the single boiler, the design power generation capacity of the unit, and the design power generation efficiency of the unit meet an equation as $n = (\eta_{re}^{-1} \times W_{re})/Q_{re}$. The thermal design power $Q_{re}$ of the single boiler is the actual thermal power of the single boiler. The design pressure of the main working medium is calculated by the following: in the case of the minimum cost of a single primary reheating boiler, the design pressure of the main working medium is adjusted after the design temperature of the main working medium is determined and then substituted into the relational expression among the cost $C_s$ of the above-mentioned single primary reheating boiler and the actual thermal power Q of the single boiler, the temperature t of the main working medium and the pressure P of the main working medium, such that the cost obtained by calculation is close to the design cost $C_{re}$ of the single primary reheating boiler, thereby selecting the appropriate design pressure of the main working medium.

Preferably, establishing the relational expression among the plurality of operating parameters in the operating parameters of each supercritical carbon dioxide unit respectively in step 2 specifically includes: establishing a relational expression between the cost $C_s$ of a single primary reheating boiler and the cost $C_d$ of a single secondary reheating boiler, wherein the relational expression between the cost $C_d$ of the single secondary reheating boiler and the cost $C_s$ of the single primary reheating boiler is as follows:

$$C_d = \frac{C_{ref,d}}{C_{ref,s}} \times C_s,$$

in which, $C_{ref,d}$ is a cost of secondary reheating boilers of generator sets with the same boiler type and operating parameters; and $C_{ref,s}$ is a reference cost of boilers for primary reheating technology for generator sets with the same boiler type and operating parameters.

The above relational expression also takes the impacts of the primary reheating technology and the secondary reheating technology on the cost of the boilers into consideration, such that the operating parameters of the supercritical carbon dioxide unit can be designed more accurately.

Based on the above boiler design method for the supercritical carbon dioxide unit, the present invention further provides a boiler design system for a supercritical carbon dioxide unit.

The boiler design system for the supercritical carbon dioxide unit includes:

a design parameter determining module configured to determine a boiler type, known design parameters and unknown design parameters of boilers to be designed, wherein the known design parameters and the unknown design parameters constitute a design parameter set of the boilers to be designed, and the design parameter set includes a design number of boilers in the supercritical carbon dioxide unit, a thermal design power of a single boiler to be designed, a design temperature of a main working medium, a design pressure of the main working medium, a design cost of a single primary reheating boiler and a design cost of a single secondary reheating boiler;

a relational expression establishing module configured to select a plurality of supercritical carbon dioxide units, a boiler type of each selected supercritical carbon dioxide unit being the same as that of the boilers to be designed, and each of the plurality of selected supercritical carbon dioxide units including one or more boilers, acquire operating parameters of each selected supercritical carbon dioxide unit respectively, the operating parameters of each supercritical carbon dioxide unit including the number n of boilers in each supercritical carbon dioxide unit, a power generation efficiency q of each supercritical carbon dioxide unit, a power generation capacity W of each supercritical carbon dioxide unit, an actual thermal power Q of a single boiler, a temperature t of the main working medium, a pressure P of the main working medium, a cost $C_s$ of a single primary reheating boiler and a cost $C_d$ of a single secondary reheating boiler; and establish a relational expression among a plurality of operating parameters in the operating parameters of each supercritical carbon dioxide unit respectively; and a designing module configured to acquire the known design parameters in the design parameter determining module and substitute the known design parameters into the relational expression established by the relational expression establishing module to determine the unknown design parameters.

Based on the boiler design method for the supercritical carbon dioxide unit, the present invention further provides a computer storage medium.

A computer storage medium includes a memory and a computer instruction stored in the memory, wherein the computer instruction, when being executed, implements the boiler design method for the supercritical carbon dioxide unit as described above.

The above description merely summarizes the technical solutions of the present invention. For understanding the technical means of the present invention more clearly, the present invention may be implemented according to the contents in the description. The present invention will be described in detail below in conjunction with preferred embodiments and accompanying drawings of the present invention. The specific embodiments of the present invention are given in detail by the following embodiments and the accompanying drawings.

BRIEF DESCRIPTION OF THE DRAWINGS

The accompanying drawings described herein are provided for further understanding of the present invention, and constitute a part of the present invention. The exemplary embodiments of the present invention and the description thereof are used to explain the present invention, and do not constitute an improper limitation of the present invention. In the accompanying drawings.

FIG. 1 is a flowchart of a boiler design method for a supercritical carbon dioxide unit according to the present invention;

FIG. 2 is a block diagram of a boiler design system for a supercritical carbon dioxide unit according to the present invention;

Figure 3:
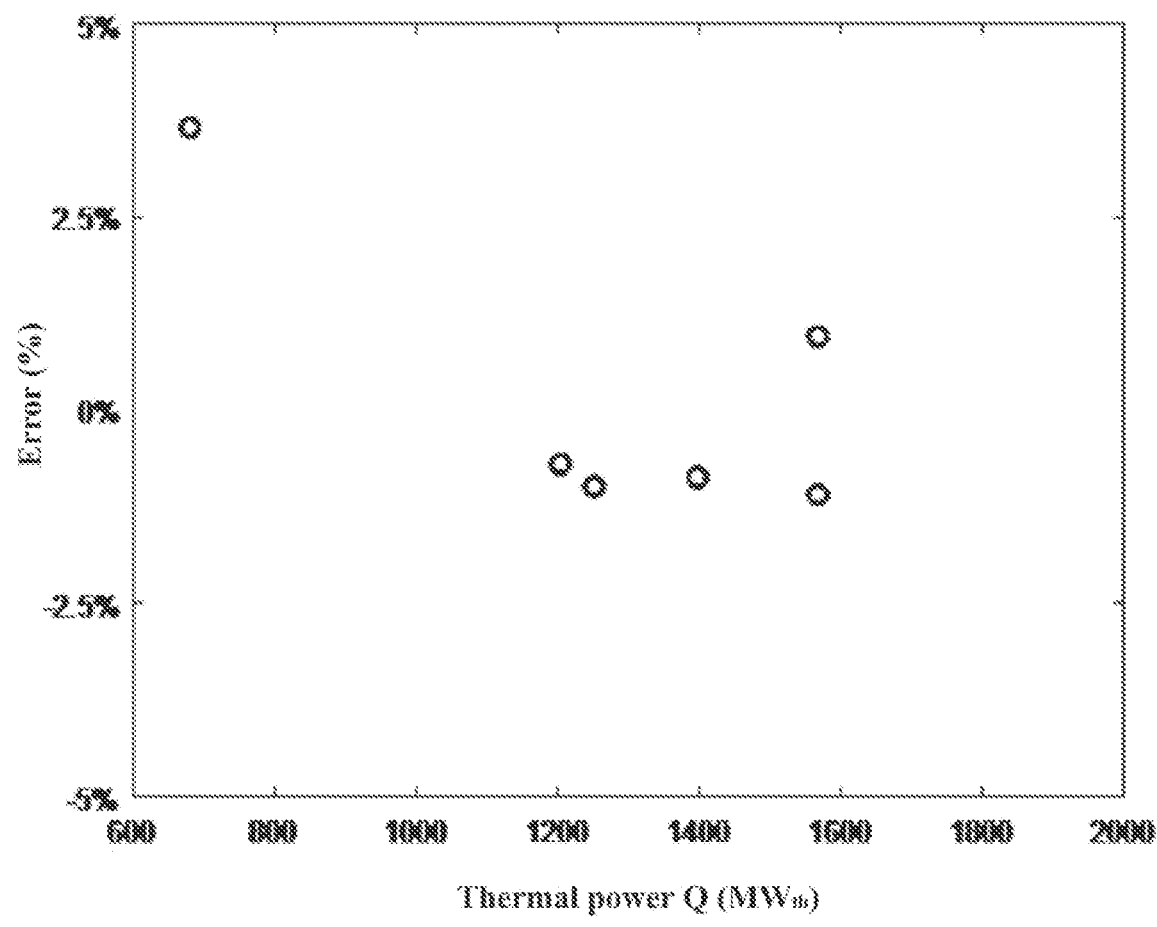
FIG. 3 is a fitting error diagram of a cost $C_s$ of a primary reheating boiler, a thermal power Q of a single boiler, a temperature t of a main working medium, and a pressure P of the main working medium according to Embodiment 1 of the present invention.

The achievement of the objects, functional characteristics and advantages of the present invention will be further described in conjunction with the embodiments and the accompanying drawings.

DETAILED DESCRIPTION OF THE EMBODIMENTS

The principles and features of the present invention will be described below with reference to FIGS. 1 to 4. The examples are only used to explain the present invention, and are not intended to limit the scope of the present invention. In the following paragraphs, the present invention is described in more detail by way of examples with reference to the accompanying drawings. The advantages and features of the present invention will be clearer according to the following description and claims. It should be noted that the accompanying drawings are all illustrated in a very simplified form, not necessarily drawn to scale, and are only used to assist in explaining the objects of the embodiments of the present invention conveniently and clearly.

Unless otherwise defined, all technical and scientific terms used in the present invention have the same meaning as commonly understood by those skilled in the technical field of the present invention. The terms used in the description of the present invention herein are only for the purpose of describing specific embodiments, and are not intended to limit the present invention. The term "and/or" as used herein includes any and all combinations of one or more related listed items.

As shown in FIG. 1, a specific flowchart of a boiler design method for a supercritical carbon dioxide unit includes the following steps.

In step 1, a boiler type, known design parameters and unknown design parameters of boilers to be designed are determined, wherein the known design parameters and the unknown design parameters constitute a design parameter set of the boilers to be designed, and the design parameter set includes a design number of boilers in the supercritical carbon dioxide unit, a thermal design power of a single boiler, a design temperature of a main working medium, a design pressure of the main working medium, a design cost of a single primary reheating boiler and a design cost of a single secondary reheating boiler.

In step 2, a plurality of supercritical carbon dioxide units is selected, a boiler type of each selected supercritical carbon dioxide unit being the same as that of the boilers to be designed, and each of the plurality of selected supercritical carbon dioxide units including one or more boilers; operating parameters of each selected supercritical carbon dioxide unit are acquired respectively, the operating parameters of each supercritical carbon dioxide unit including the number n of boilers in each supercritical carbon dioxide unit, a power generation efficiency q of each supercritical carbon dioxide unit, a power generation capacity W of each supercritical carbon dioxide unit, an actual thermal power Q of a single boiler, a temperature t of the main working medium, a pressure P of the main working medium, a cost $C_s$ of a single primary reheating boiler, and a cost $C_d$ of a single secondary reheating boiler; and a relational expression among a plurality of operating parameters in the operating parameters of each supercritical carbon dioxide unit is established respectively.

In step 3, the known design parameters in step 1 are substituted into the relational expression established in step 2, and the unknown design parameters are calculated.

Based on the above content, the following specific embodiments of the present invention are proposed.

Embodiment 1

In Embodiment 1, a supercritical carbon dioxide unit to which boilers to be designed belong has a design power generation efficiency $\eta_{re}$ of 0.5, and a design power generation capacity $W_{re}$ of 1000 MW. The boilers to be designed are π-type boilers. In addition, known design parameters of the boilers to be designed include a design temperature $t_{re}$ of a main working medium of 620° C., and a design pressure $P_{re}$ of the main working medium of 300 bar. In the cases of the optimal performance and the minimum design cost $C_{re,s}$ of a single primary reheating boiler, unknown design parameters include a thermal design power $Q_{re}$ of a single boiler and a design cost $C_{re,s}$ of a primary reheating boiler.

Six supercritical carbon dioxide units with the optional energy efficiency are selected, and boilers of the six supercritical carbon dioxide units are all π-type. The number and parameters of the boilers of the six supercritical carbon dioxide units are shown in Table 1.

TABLE 1

| | | | | | | |
|---|---|---|---|---|---|---|
| Number of boilers | 1 | 1 | 2 | 2 | 3 | 4 |
| Power generation capacity W of unit (MW) | 350 | 660 | 1200 | 1400 | 2400 | 3200 |
| Actual thermal power Q of single boiler ($MW_{th}$) | 681 | 1253 | 1205 | 1399 | 1569 | 1569 |
| Temperature t of main working medium (° C.) | 600 | 625 | 620 | 625 | 650 | 650 |
| Pressure P of main working medium (bar) | 300 | 315 | 300 | 315 | 330 | 330 |
| Cost $C_s$ of single primary reheating boiler ($10^3$CNY/$MW_{th}$) | 301 | 336 | 314 | 330 | 397 | 389 |
| Cost $C_d$ of single secondary reheating boiler ($10^3$CNY/$MW_{th}$) | — | 441 | 415 | 428 | 526 | 520 |

The costs $C_s$ of a single primary reheating boiler and the power generation efficiency η of each supercritical carbon dioxide unit, the power generation capacity W of each unit, the actual thermal power Q of a single boiler, the temperature t of a main working medium and the pressure P of the main working medium in the selected six supercritical carbon dioxide units are fitted to obtain the following relational expression:

$$C_s=(r_1(\eta^{-1}\times W/n+r_2t+r_3)^2+r_4)(r_5P+r_6)(r_7t+r_8)+r_9 \text{ or}$$

$$C_s=(r_1\times(Q+r_2t+r_3)^2+r_4)(r_5P+r_6)(r_7t+r_8)+r_9.$$

In this embodiment, the values of the fitting coefficients $r_1$, $r_2$, $r_3$, $r_4$, $r_5$, $r_6$, $r_7$, $r_8$ and $r_9$ are shown in Table 2.

TABLE 2

| Coefficient | Value |
|---|---|
| $r_1$ | $1.88716 \times 10^{-9}$ |
| $r_2$ | $-5.47995$ |
| $r_3$ | $1.93255 \times 10^3$ |
| $r_4$ | $5.36167 \times 10^{-1}$ |
| $r_5$ | $1.22278 \times 10^{-3}$ |
| $r_6$ | $5.36722 \times 10^1$ |
| $r_7$ | $7.60140 \times 10^{-2}$ |
| $r_8$ | $1.07543 \times 10^3$ |
| $r_9$ | $-3.22208 \times 10^4$ |

A fitting error diagram of the above relational expression is shown in FIG. 3.

In this embodiment, the cost $C_s$ of a single primary reheating boiler has a unit of $10^3$CNY/$MW_{th}$; the actual thermal power Q of a single boiler has a unit of $MW_{th}$; the pressure P of the main working medium has a unit of bar; the temperature t of the main working medium has a unit of ° C.; the power generation efficiency q of each supercritical carbon dioxide unit has a unit of 1; and the power generation capacity W of each supercritical carbon dioxide unit has a unit of MW.

As can be seen from the above relational expression, the smaller the value of $(Q+r_2\times t+r)^2$ is, the lowest cost $C_s$ of a single primary reheating boiler is. In the case of the minimum cost $C_s$ of a single primary reheating boiler, the thermal design power $Q_{re}$ of a single boiler is as follows:

$$Q_{re}=-r_2\times t_{re}-r_3=5.47995\times 620-1932.55=1465.019 \text{ } MW_{th}.$$

$\zeta=(\eta^{-1}\times W)/Q_{re}=0.5^{-1}\times 1000/1465.019=1.3652$ is calculated by substituting the calculated $Q_{re}=1465.019$ $MW_{th}$ into $\zeta=(\eta^{-1}\times W)/Q$.

In the case of $\zeta<1.4$, the number of boilers in the supercritical carbon dioxide unit is 1. In fact, the thermal power Q of the single boiler is $\eta^{-1}$ W/n=$0.5^{-1}\times1000$=2000 MW$_{th}$.

The cost $C_{re,s}$ of a single primary reheating boiler is as follows:

$C_{re,s}$=((1.88716×10$^{-9}$×(0.5$^{-1}$×1000−5.47995×620+ 1932.55)$^2$+0.536167)×(1.22278×10$^{-3}$×300+ 53.6722)×(0.076014/620+1075.43)− 32220.8=336.92×10$^3$ CNY/MW$_{th}$.

The cost of the boilers in the supercritical carbon dioxide unit is as follows:

$n\times C_{re,s}\times Q$=1×336.92×10$^3$×2000=6.7384×10$^8$ CNY.

Embodiment 2

In Embodiment 2, a supercritical carbon dioxide unit to which boilers to be designed belong has a design power generation efficiency $\eta_{re}$ of 0.5, and a design power generation capacity $W_{re}$ of 1000 MW. The boilers to be designed are tower-type boilers. Known design parameters of the boilers to be designed include a design temperature $t_{re}$ of a main working medium of 600° C., and a design pressure $P_{re}$, of the main working medium of 300 bar. In the cases of the optimal performance and the minimum design cost $C_{re,s}$ of a single primary reheating boiler, unknown design parameters are calculated, the unknown design parameters including a thermal design power $Q_{re}$ of a single boiler.

Six supercritical carbon dioxide units with the optional energy efficiency are selected, and boilers for the six supercritical carbon dioxide units are all tower-type. The number and operating parameters of the boilers for the six supercritical carbon dioxide units are shown in Table 3.

TABLE 3

| Number of boilers | 1 | 1 | 2 | 2 | 3 | 4 |
|---|---|---|---|---|---|---|
| Power generation capacity W of unit (MW) | 350 | 669 | 1200 | 1400 | 2400 | 3200 |
| Actual thermal power Q of a single boiler (MW$_{th}$) | 678 | 1258 | 1205 | 1399 | 1569 | 1569 |
| Temperature t of main working medium (° C.) | 600 | 625 | 620 | 625 | 650 | 650 |
| Pressure P of main working medium (bar) | 315 | 300 | 300 | 315 | 330 | 330 |
| Cost $C_s$ of single primary reheating boiler (10$^3$CNY/MW$_{th}$) | 351 | 344 | 330 | 341 | 420 | 411 |
| Cost $C_d$ of single secondary reheating boiler (10$^3$CNY/MW$_{th}$) | — | 384 | 370 | 384 | 469 | 462 |

A fitting relational expression among the cost $C_s$ of a single primary reheating boiler and the power generation efficiency $\eta$ of each unit, the power generation capacity W of each unit, the actual thermal power Q of a single boiler, the temperature t of the main working medium and the pressure P of the main working medium is as follows.

$C_s=(r_1\times(Q+r_2t+r_3)^2+r_4)(r_5P+r_6)(r_7t+r_8)+r_9$, or $C_s=(r_1\times(\eta^{-1}\times W/n+r_2t+r_3)^2+r_4)(r_5P+r_6)(r_7t+r_8)+r_9$, In this embodiment, the values of the fitting coefficients $r_1$, $r_2$, $r_3$, $r_4$, $r_5$, $r_6$, $r_7$, $r_8$ and $r_9$ are shown in Table 4.

TABLE 4

| Coefficient | Value |
|---|---|
| $r_1$ | 1.91936 × 10$^{-9}$ |
| $r_2$ | −5.47995 |
| $r_3$ | 1.93254 × 10$^3$ |
| $r_4$ | 5.45299 × 10$^{-1}$ |
| $r_5$ | 1.24391 × 10$^{-3}$ |
| $r_6$ | 5.45982 × 10$^1$ |
| $r_7$ | 7.74409 × 10$^{-2}$ |
| $r_8$ | 1.09558 × 10$^3$ |
| $r_9$ | −3.39599 × 10$^4$ |

In this embodiment, the cost $C_s$ of a single primary reheating boiler has a unit of 10$^3$CNY/MW$_{th}$; the actual thermal power Q of a single boiler has a unit of MW$_{th}$; the pressure P of the main working medium has a unit of bar; the temperature t of the main working medium has a unit of ° C.; the power generation efficiency $\eta$ of the supercritical carbon dioxide unit has a unit of 1; and the power generation capacity W of the supercritical carbon dioxide unit has a unit of MW.

Figure 4:
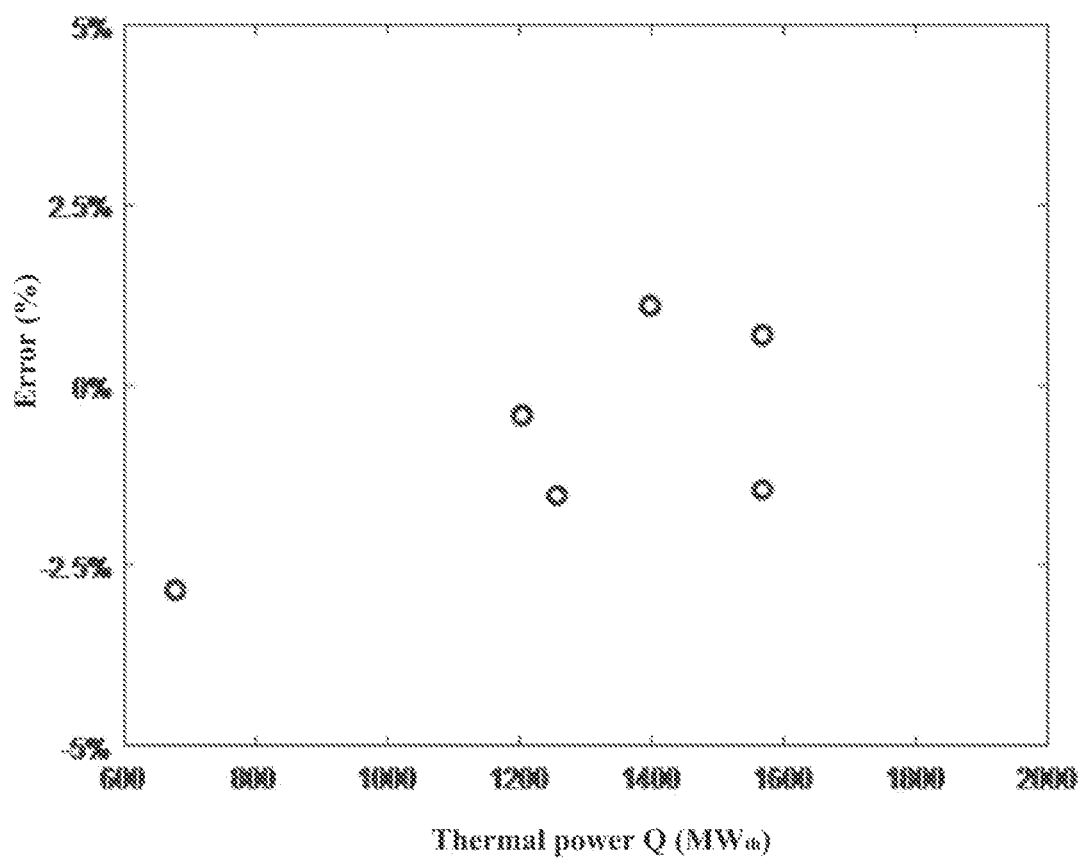
FIG. 4 is a fitting error diagram of a cost $C_s$ of a primary reheating boiler, a thermal power Q of a single boiler, a temperature t of a main working medium, and a pressure P of the main working medium according to Embodiment 2 of the present invention.

An error graph of a fitting relational expression among the cost $C_s$ of a single primary reheating boiler and the power generation efficiency $\eta$ of each unit, the power generation capacity W of each unit, the actual thermal power Q of a single boiler, the temperature t of the main working medium and the pressure P of the main working medium is as shown in FIG. 4.

In the case of the minimum design cost of a single primary reheating boiler, the optimal value of the thermal design power of the single boiler is $Q_{re}$=−$r_2t_{re}$−$r_3$=5.47995×600− 1932.54=1355.43 MW$_{th}$.

$\zeta=(\eta^{-1}\times W)/Q_{re}$=0.5$^{-1}$×1000/1355.43=1.4755 is calculated by substituting the optimal value of the calculated thermal design power $Q_{re}$ of the single boiler into n=($\eta^{-1}$× W)/Q.

In the case of 1.4<$\zeta$<1.6, the number n of boilers in the supercritical carbon dioxide unit in this embodiment is taken as 2.

That is, the number of boilers is selected as 2 based on the minimum cost $C_s$ of the single primary reheating boiler. At this time, the thermal power Q of a single boiler is actually $\eta^{-1}\times W/n$=0.5$^{-1}$×1000/2=1000 MW$_{th}$.

The design cost of the single primary reheating boiler is as follows:

$C_{re,s}$=((1.91936×10$^{-9}$×(0.5$^{-1}$×1000/2−5.47995×620+ 1932.54)$^2$+0.545299)×(1.24391×10$^{-3}$×300+ 54.5982)×(0.0774409×620+1095.58)− 33959.9=346.3585×10$^3$ CNY/MW$_{th}$.

Referring to specific operating parameters of a boiler disclosed in the *Cost Indexes of Quota Design Parameters in Thermal Power Project* published by Electric Power Planning and Engineering Institute in which the temperature of a main working medium is 600° C. and the pressure of the main working medium is 270-300 bar, it is disclosed in page 149 that the cost of a tower-type furnace adopting a primary reheating boiler is 4.85×10$^6$ CNY, and the cost of a tower-type furnace adopting a secondary reheating boiler is 5.4× 10$^6$ CNY.

The design cost of the tower-type furnace of each single secondary reheating boiler is as follows:

$C_{re,d}$=5.4×10$^6$×346.3585×10$^3$/4.85×10$^6$=385.6363× 10$^3$ CNY/MW$_{th}$.

In this embodiment, the total design cost of boilers of a tower-type furnace adopting two secondary reheating boilers is as follows:

$n\times C_{re,s}\times Q$=2×385.6363×10$^3$×1000=771.2726×10$^8$ CNY.

Embodiment 3

Different from Embodiment 2, a supercritical carbon dioxide unit to which boilers to be designed belong has a design power generation efficiency $\eta_{re}$ of 0.5, and a design power generation capacity $W_{re}$ of 800 MW. The boilers to be designed are tower-type boilers. Known design parameters include a thermal design power $Q_{re}$ of a single boiler of 1600 $MW_{th}$, and a design cost $C_{re,s}$ of a single primary reheating boiler of $320 \times 10^3$ $CNY/MW_{th}$; and unknown design parameters include a design temperature of a main working medium, and a design pressure of the main working medium. In this embodiment, in the cases of optimal performances and minimum design cost $C_{re,s}$ of a single primary reheating boiler, an appropriate design temperature and design pressure of the main working medium are selected.

In the case of the minimum cost $C_{re,s}$ of the single primary reheating boiler, the temperature of the main working medium is as follows:

$$t_{re}=(-r_3-Q_{re})/r_2=(1932.54+1600)/5.47995=644.63°\text{ C.}$$

The temperature range of the main working medium is [612.40, 676.86], and the design temperature of the main working medium in this embodiment is 625° C.

Then, $C_s=(r_1 \times (Q+r_2t+r_3)2+r_4)(r_5P_{Re}+r_6)(r_7t+r_8)+r_9 \leq 320$.

$$C_s=(1.91936 \times 10^{-9} \times (1600-5.47995 \times 625+1932.54)^2+\\0.545299) \times (1.24391 \times 10^{-3} \times P_{re}+5\ 4.5982) \times \\(0.0774409 \times 625+1095.58)-33959.9 \leq 320.$$

That is, $0.54532121 \times (1.24391 \times 10^{-3} \times P_{re}+54.5982) \times 1143.9805625-33959.9 \leq 320$.

Then, $P_{re} \leq 1283$ bar.

In this embodiment, the value range of the design pressure $P_{re}$ of the main working medium is [100, 283] bar in order to control the cost of the boilers to be designed within a range less than or equal to the design cost $C_{re,s}$ of a single primary reheating boiler.

As shown in FIG. 2, Embodiment 3 specifically further discloses a system for implementing the boiler design method for the supercritical carbon dioxide unit. The system specifically includes the following modules.

A design parameter determining module is configured to determine a boiler type, known design parameters and unknown design parameters of boilers to be designed, wherein the known design parameters and the unknown design parameters constitute a design parameter set of the boilers to be designed, and the design parameter set includes a design number of boilers in the supercritical carbon dioxide unit, a thermal design power of a single boiler to be designed, a design temperature of a main working medium, a design pressure of the main working medium, a design cost of a single primary reheating boiler and a design cost of a single secondary reheating boiler.

A relational expression establishing module is configured to select a plurality of supercritical carbon dioxide units, a boiler type of each selected supercritical carbon dioxide unit being the same as that of the boiler to be designed, and each of the plurality of selected supercritical carbon dioxide units includes one or more boilers; acquire operating parameters of each selected supercritical carbon dioxide unit respectively, the operating parameters of each supercritical carbon dioxide unit including the number n of boilers in each supercritical carbon dioxide unit, a power generation efficiency q of each supercritical carbon dioxide unit, a power generation capacity W of each supercritical carbon dioxide unit, an actual thermal power Q of a single boiler, a temperature t of a main working medium, a pressure P of the main working medium, a cost $C_s$ of a single primary reheating boiler and a cost $C_d$ of a single secondary reheating boiler, and establish a relational expression among a plurality of operating parameters in the operating parameters of each supercritical carbon dioxide unit respectively.

A designing module is configured to acquire the known design parameters in the design parameter determining module and substitute the known design parameters into the relational expression established by the relational expression establishing module to determine the unknown design parameters.

The boiler design system for the supercritical carbon dioxide unit disclosed in this embodiment is configured to implement the above-mentioned boiler design method for the supercritical carbon dioxide unit, so as to realize the optimized design of the boilers in the supercritical carbon dioxide unit.

Based on the boiler design method for the supercritical carbon dioxide unit, the present invention further provides a computer storage medium.

A storage medium includes a memory and a computer instruction stored in the memory, wherein the computer instruction, when being executed, implements the boiler design method for the supercritical carbon dioxide unit as described above.

According to the present invention, the operating parameters of the boilers, with the optimal performance, in the supercritical carbon dioxide unit are selected to establish the relational expression, and the unknown operating parameters can be calculated based on the known design parameters and the relational expressions in the boilers to be designed, thereby acquiring the boiler design with the optimal performance.

The above described is only preferred embodiments of the present invention, and is not intended to limit the present invention in any form. Any person of ordinary skill in the art can successfully implement the present invention as shown in the accompanying drawings and described above. However, all equivalent changes of some changes, modifications and evolutions made by those skilled in the art using the technical content disclosed above without departing from the scope of the technical solutions of the present invention are equivalent embodiments of the present invention. Meanwhile, any equivalent changes, modifications, and evolutions made to the above embodiments according to the essential technology of the present invention still fall within the protection scope of the technical solutions of the present invention.

What is claimed is:

1. An optimal boiler design method for a supercritical carbon dioxide unit, comprising the following steps:

step 1, determining a boiler type, known design parameters and unknown design parameters of boilers to be designed, wherein the known design parameters and the unknown design parameters constitute a design parameter set of the boilers to be designed, and the design parameter set comprises a design number of boilers in the supercritical carbon dioxide unit, a thermal design power of a single boiler to be designed, a design temperature of a main working medium, a design pressure of the main working medium, a design cost of a single primary reheating boiler and a design cost of a single secondary reheating boiler;

step 2, selecting a plurality of supercritical carbon dioxide units, wherein a boiler type of each selected supercritical carbon dioxide unit is the same as that of the boiler to be designed, and each of the plurality of selected supercritical carbon dioxide units comprises one or more boilers; acquiring operating parameters of each selected supercritical carbon dioxide unit respectively, wherein the operating parameters of each supercritical carbon dioxide unit comprises a number n of boilers in each supercritical carbon dioxide unit, a power generation efficiency η of each supercritical carbon dioxide unit, a power generation capacity W of each supercritical carbon dioxide unit, an actual thermal power Q of the single boiler, a temperature t of the main working medium, a pressure P of the main working medium, a cost $C_s$ of the single primary reheating boiler and a cost $C_d$ of the single secondary reheating boiler; and establishing a relational expression among a plurality of operating parameters in the operating parameters of each supercritical carbon dioxide unit respectively; and step 3, substituting the known design parameters in step 1 into the relational expression established in step 2, and calculating the unknown design parameters to increase the operating efficiency or to reduce cost of the boiler; wherein the unknown design parameters comprise a design number of boilers when the known design parameters comprise the thermal design power $Q_{re}$ of the single boiler; and after the design power generation capacity of the supercritical carbon dioxide unit to which the boilers to be designed belong and the design power generation efficiency of the supercritical carbon dioxide unit are determined, a selection coefficient for the design number of the boilers in the supercritical carbon dioxide unit is as follows:

$$\zeta=(\eta_{re}^{-1}\times W_{re})/Q_{re};$$

in case of $\zeta<1.4$, the design number n of the boilers to be designed is 1;

in case of $X.4\leq\zeta\leq X.6$, the design number n of the boilers to be designed is X or X+1; and in case of $X.6<\zeta<(X+1).4$, the design number n of the boilers to be designed is X+1, wherein, X is an integer greater than or equal to 1, $\zeta$ is the selection coefficient, $\eta_{re}$ is the design power generation efficiency of each supercritical carbon dioxide unit, $W_{re}$ is the design power generation capacity of each supercritical carbon dioxide unit, and $Q_{re}$ is the design thermal power of the single boiler.

2. The boiler design method for the supercritical carbon dioxide unit according to claim 1, wherein the step of establishing the relational expression among the plurality of operating parameters in the operating parameters of each supercritical carbon dioxide unit respectively in step 2 specifically comprises: establishing a relational expression among the number n of the boilers in each supercritical carbon dioxide unit and the power generation efficiency η of each supercritical carbon dioxide unit, the power generation capacity W of each supercritical carbon dioxide unit and the actual thermal power Q of the single boiler, wherein the relational expression among the number n of the boilers in each supercritical carbon dioxide unit and the power generation efficiency η of each supercritical carbon dioxide unit, the power generation capacity W of each supercritical carbon dioxide unit and the actual thermal power Q of the single boiler is as follows:

$$n=(\eta^{-1}\times W)/Q,$$

wherein, n is the number of the boilers in each supercritical carbon dioxide unit; η is the power generation efficiency of each supercritical carbon dioxide unit; W is the power generation capacity of each supercritical carbon dioxide unit; and Q is the actual thermal power of the single boiler.

3. The boiler design method for the supercritical carbon dioxide unit according to claim 1, wherein the step of establishing the relational expression among the plurality of operating parameters in the operating parameters of each supercritical carbon dioxide unit respectively in step 2 specifically comprises: establishing a relational expression among the cost $C_s$ of a single primary reheating boiler and the power generation efficiency η of each supercritical carbon dioxide unit, the power generation capacity W of each supercritical carbon dioxide unit, the actual thermal power Q of the single boiler, the number n of boilers in each supercritical carbon dioxide unit, the temperature t of the main working medium and the pressure P of the main working medium, wherein the relational expression among the cost $C_s$ of the single primary reheating boiler and the power generation efficiency η of each supercritical carbon dioxide unit, the power generation capacity W of each supercritical carbon dioxide unit, the actual thermal power Q of the single boiler, the number n of boilers in each supercritical carbon dioxide unit, the temperature t of the main working medium and the pressure P of the main working medium is as follows:

$$C_s=(r_1\times(Q+r_2t+r_3)^2+r_4)(r_5P+r_6)(r_7t+r_8)+r_9, \text{ or}$$

$$C_s=(r_1\times(\eta^{-1}\times W/n+r_2t+r_3)^2+r_4)(r_5P+r_6)(r_7t+r_8)+r_9,$$

wherein, $C_s$ is the cost of the single primary reheating boiler; Q is the actual thermal power of the single boiler; P is the pressure of the main working medium; t is the temperature of the main working medium; η is the power generation efficiency of each supercritical carbon dioxide unit; W is the power generation capacity of each supercritical carbon dioxide unit; and $r_1$, $r_2$, $r_3$, $r_4$, $r_5$, $r_6$, $r_7$, $r_8$, and $r_9$ are all coefficients.

4. The boiler design method for the supercritical carbon dioxide unit according to claim 3, wherein in case of a minimum cost of the single primary reheating boiler, a relational expression between the actual thermal power Q of the single boiler and the temperature t of the main working medium is as follows:

$$Q=-r_2t-r_3,$$

wherein, Q is the actual thermal power of the single boiler; t is the temperature of the main working medium; and $r_2$ and $r_3$ are coefficients.

5. The boiler design method for the supercritical carbon dioxide unit according to claim 4, wherein when the known design parameters comprise the thermal design power $Q_{re}$ of the single boiler and the unknown design parameters comprise the design temperature of the main working medium, the design temperature $t_{re}$ of the main working medium is $[0.95(-r_3-Q_{re})/r_2, 1.05(-r_3-Q_{re})/r_2]$ in case of the minimum cost $C_s$ of the single primary reheating boiler.

6. The boiler design method for the supercritical carbon dioxide unit according to claim 5, wherein when the known design parameters comprise the thermal design power $Q_{re}$ of the single boiler and a maximum design cost $C_{re}$ of a primary reheating boiler of the single boiler, and the unknown design parameters comprise the design temperature of the main working medium and the design pressure of the main working medium, a value range of the design pressure $P_{re}$ of the main working medium is as follows:

$$\left[100, \frac{C_{re,s} - r_9}{(r_1(Q_{re} + r_2 t + r_3)^2 + r_4)(r_7 t_{re} + r_8) r_5} - \frac{r_6}{r_5}\right].$$

7. The boiler design method for the supercritical carbon dioxide unit according to claim 1, wherein the step of establishing the relational expression among the plurality of operating parameters in the operating parameters of each supercritical carbon dioxide unit respectively in step 2 specifically comprises: establishing a relational expression between the cost $C_s$ of the single primary reheating boiler and the cost $C_d$ of the single secondary reheating boiler, wherein the relational expression between the cost $C_d$ of the single secondary reheating boiler and the cost $C_s$ of the single primary reheating boiler is as follows:

$$C_d = \frac{C_{ref,d}}{C_{ref,s}} \times C_s,$$

wherein, $C_{ref,d}$ is a cost of secondary reheating boilers for generator sets with same boiler type and operating parameters; and $C_{ref,s}$ is a reference cost of boilers for primary reheating technology for the generator sets with the same boiler type and operating parameters.

8. An optimal boiler design system having memory and processor for a supercritical carbon dioxide unit, the design system having a set of modules stored on the memory and processed by the processor, the modules comprising:

a design parameter determining module configured to determine a boiler type, known design parameters and unknown design parameters of boilers to be designed, wherein the known design parameters and the unknown design parameters constitute a design parameter set of the boilers to be designed, and the design parameter set comprises a design number of boilers in the supercritical carbon dioxide unit, a thermal design power of a single boiler to be designed, a design temperature of a main working medium, a design pressure of the main working medium, a design cost of a single primary reheating boiler and a design cost of a single secondary reheating boiler;

a relational expression establishing module configured to:
select a plurality of supercritical carbon dioxide units, wherein a boiler type of each selected supercritical carbon dioxide unit is the same as that of the boiler to be designed, and each of the plurality of selected supercritical carbon dioxide units comprises one or more boilers;
acquire operating parameters of each selected supercritical carbon dioxide unit respectively, wherein the operating parameters of each supercritical carbon dioxide unit comprises a number n of boilers in each supercritical carbon dioxide unit, a power generation efficiency $\eta$ of each supercritical carbon dioxide unit, a power generation capacity W of each supercritical carbon dioxide unit, an actual thermal power Q of the single boiler, a temperature t of the main working medium, a pressure P of the main working medium, a cost $C_s$ of the single primary reheating boiler and a cost $C_d$ of the single secondary reheating boiler; and
establish a relational expression among a plurality of operating parameters in the operating parameters of each supercritical carbon dioxide unit respectively; and a designing module configured to acquire the known design parameters in the design parameter determining module and substitute the known design parameters into the relational expression established by the relational expression establishing module to determine the unknown design parameters to increase the operating efficiency or to reduce cost of the boiler; wherein the unknown design parameters comprise a design number of boilers when the known design parameters comprise the thermal design power $Q_{re}$ of the single boiler, and after the design power generation capacity of the supercritical carbon dioxide unit to which the boilers to be designed belong and the design power generation efficiency of the supercritical carbon dioxide unit are determined, a selection coefficient for the design number of the boilers in the supercritical carbon dioxide unit is as follows:

$\zeta = (\eta_{re}^{-1} \times W_{re})/Q_{re};$ in case of $\zeta < 1.4$, the design number n of the boilers to be designed is 1;
in case of $X.4 \leq \zeta \leq X.6$, the design number n of the boilers to be designed is X or X+1; and
in case of $X.6 < \zeta < (X+1).4$, the design number n of the boilers to be designed is X+1,
wherein, X is an integer greater than or equal to 1, $\zeta$ is the selection coefficient, $\eta_{re}$ is the design power generation efficiency of each supercritical carbon dioxide unit, $W_{re}$ is the design power generation capacity of each supercritical carbon dioxide unit, and $Q_{re}$ is the design thermal power of the single boiler.

9. A non-transitory storage medium, comprising a memory and a computer instruction stored in the memory, wherein the computer instruction, when being executed, implements the boiler design method for the supercritical carbon dioxide unit according to claim 1.

10. The non-transitory storage medium according to claim 9, wherein the step of establishing the relational expression among the plurality of operating parameters in the operating parameters of each supercritical carbon dioxide unit respectively in step 2 specifically comprises: establishing a relational expression among the number n of the boilers in each supercritical carbon dioxide unit and the power generation efficiency $\eta$ of each supercritical carbon dioxide unit, the power generation capacity W of each supercritical carbon dioxide unit and the actual thermal power Q of the single boiler, wherein the relational expression among the number n of the boilers in each supercritical carbon dioxide unit and the power generation efficiency $\eta$ of each supercritical carbon dioxide unit, the power generation capacity W of each supercritical carbon dioxide unit and the actual thermal power Q of the single boiler is as follows:

$n = (\eta^{-1} \times W)/Q.$ wherein, n is the number of the boilers in each supercritical carbon dioxide unit; η is the power generation efficiency of each supercritical carbon dioxide unit; W is the power generation capacity of each supercritical carbon dioxide unit; and Q is the actual thermal power of the single boiler.

11. The non-transitory storage medium according to claim 10, wherein
the unknown design parameters comprise a design number of boilers when the known design parameters comprise the thermal design power $Q_{re}$ of a single boiler; and
after the design power generation capacity of the supercritical carbon dioxide unit to which the boilers to be designed belong and the design power generation efficiency of the supercritical carbon dioxide unit are determined, a selection coefficient for the design number of the boilers in the supercritical carbon dioxide unit is as follows:

$$\zeta = (\eta_{re}^{-1} \times W_{re})/Q_{re};$$

in case of $\zeta < 1.4$, the design number n of the boilers to be designed is 1;
in case of $X.4 \leq \zeta \leq X.6$, the design number n of the boilers to be designed is X or X+1; and
in case of $X.6 < \zeta < (X+1).4$, the design number n of the boilers to be designed is X+1,
wherein, X is an integer greater than or equal to 1, $\zeta$ is the selection coefficient, $\eta_{re}$ is the design power generation efficiency of each supercritical carbon dioxide unit, $W_{re}$ is the design power generation capacity of each supercritical carbon dioxide unit, and $Q_{re}$ is the design thermal power of the single boiler.

12. The non-transitory storage medium according to claim 9, wherein
the step of establishing the relational expression among the plurality of operating parameters in the operating parameters of each supercritical carbon dioxide unit respectively in step 2 specifically comprises: establishing a relational expression among the cost $C_s$ of a single primary reheating boiler and the power generation efficiency η of each supercritical carbon dioxide unit, the power generation capacity W of each supercritical carbon dioxide unit, the actual thermal power Q of the single boiler, the number n of boilers in each supercritical carbon dioxide unit, the temperature t of the main working medium and the pressure P of the main working medium, wherein
the relational expression among the cost $C_s$ of the single primary reheating boiler and the power generation efficiency η of each supercritical carbon dioxide unit, the power generation capacity W of each supercritical carbon dioxide unit, the actual thermal power Q of the single boiler, the number n of boilers in each supercritical carbon dioxide unit, the temperature t of the main working medium and the pressure P of the main working medium is as follows:

$$C_s = (r_1 x(Q + r_2 t + r_3)^2 + r_4)(r_5 P + r_6)(r_7 t + r_8) + r_9, \text{ or}$$

$$C_s = (r_1 \times (\eta^{-1} \times W/n + r_2 t + r_3)^2 + r_4)(r_5 P + r_6)(r_7 t + r_8) + r_9,$$

wherein, $C_s$ is the cost of the single primary reheating boiler; Q is the actual thermal power of the single boiler; P is the pressure of the main working medium; t is the temperature of the main working medium; η is the power generation efficiency of each supercritical carbon dioxide unit; W is the power generation capacity of each supercritical carbon dioxide unit; and $r_1$, $r_2$, $r_3$, $r_4$, $r_5$, $r_6$, $r_7$, $r_8$, and $r_9$ are all coefficients.

13. The non-transitory storage medium according to claim 12, wherein
in case of a minimum cost of the single primary reheating boiler, a relational expression between the actual thermal power Q of the single boiler and the temperature t of the main working medium is as follows:

$$Q = -r_2 t - r_3,$$

wherein, Q is the actual thermal power of the single boiler; t is the temperature of the main working medium; and $r_2$ and $r_3$ are coefficients.

14. The non-transitory storage medium according to claim 13, wherein
when the known design parameters comprise the thermal design power $Q_{re}$ of the single boiler and the unknown design parameters comprise the design temperature of the main working medium, the design temperature $t_{re}$ of the main working medium is
$[0.95(-r_3 - Q_{re})/r_2, 1.05(-r_3 - Q_{re})/r_2]$ in case of the minimum cost $C_s$ of the single primary reheating boiler.

15. The non-transitory storage medium according to claim 14, wherein
when the known design parameters comprise the thermal design power $Q_{re}$ of the single boiler and a maximum design cost $C_{re}$ of a primary reheating boiler of the single boiler, and the unknown design parameters comprise the design temperature of the main working medium and the design pressure of the main working medium, a value range of the design pressure $P_{re}$ of the main working medium is as follows:

$$\left[100, \frac{C_{re,s} - r_9}{(r_1(Q_{re} + r_2 t + r_3)^2 + r_4)(r_7 t_{re} + r_8) r_5} - \frac{r_6}{r_5}\right].$$

16. The non-transitory storage medium according to claim 9, wherein
the step of establishing the relational expression among the plurality of operating parameters in the operating parameters of each supercritical carbon dioxide unit respectively in step 2 specifically comprises: establishing a relational expression between the cost $C_s$ of the single primary reheating boiler and the cost $C_d$ of the single secondary reheating boiler, wherein
the relational expression between the cost $C_d$ of the single secondary reheating boiler and the cost $C_s$ of the single primary reheating boiler is as follows:

$$C_d = \frac{C_{ref,d}}{C_{ref,s}} \times C_s,$$

wherein, $C_{ref,d}$ is a cost of secondary reheating boilers for generator sets with same boiler type and operating parameters; and $C_{ref,s}$ is a reference cost of boilers for primary reheating technology for the generator sets with the same boiler type and operating parameters.

\* \* \* \* \*